US011395965B1

(12) United States Patent
Boyajian et al.

(10) Patent No.: US 11,395,965 B1
(45) Date of Patent: Jul. 26, 2022

(54) SYSTEM AND METHOD FOR CAPTURING, REPLAYING, AND MODIFYING DATA INPUTS AND METHODS OF USE THEREOF

(71) Applicant: Dark Burn Creative LLC, Chatsworth, CA (US)

(72) Inventors: Tanner Lucas Boyajian, Newbury Park, CA (US); Christopher Addison Harris, Woodland Hills, CA (US); Clifford Solomon Elion, Thousand Oaks, CA (US)

(73) Assignee: Dark Burn Creative LLC, Chatsworth, CA (US)

( * ) Notice: Subject to any disclaimer, the term of this patent is extended or adjusted under 35 U.S.C. 154(b) by 0 days.

(21) Appl. No.: 17/072,572

(22) Filed: Oct. 16, 2020

Related U.S. Application Data

(60) Provisional application No. 62/915,748, filed on Oct. 16, 2019.

(51) Int. Cl.
*A63F 13/497* (2014.01)

(52) U.S. Cl.
CPC ................... *A63F 13/497* (2014.09)

(58) Field of Classification Search
CPC .................................................. A63F 13/497
See application file for complete search history.

(56) References Cited

U.S. PATENT DOCUMENTS

| 5,259,626 | A | 11/1993 | Ho |
| 5,317,505 | A | 5/1994 | Karabed et al. |
| 6,071,194 | A | 6/2000 | Sanderson et al. |
| 6,764,401 | B1 | 7/2004 | Akatsuka |
| 6,989,818 | B2 | 1/2006 | Biheller et al. |
| 7,789,741 | B1 * | 9/2010 | Fields ..................... A63F 13/49 463/2 |
| 7,991,890 | B2 * | 8/2011 | Schmidt .................. A63F 13/10 709/226 |
| 8,041,860 | B2 * | 10/2011 | Ye .......................... A63F 13/06 710/62 |
| 8,057,290 | B2 * | 11/2011 | Vance .................... A63F 13/211 463/7 |
| 8,094,124 | B2 * | 1/2012 | Sayyadi .............. G06F 3/03543 345/163 |
| 8,485,899 | B1 * | 7/2013 | Rom ....................... A63F 13/42 463/31 |
| 8,556,721 | B2 * | 10/2013 | Aronzon ................ A63F 13/22 463/39 |
| 8,845,431 | B2 * | 9/2014 | Langridge .............. A63F 13/42 463/36 |
| 9,298,263 | B2 * | 3/2016 | Geisner .................. G06F 3/017 |
| 10,022,634 | B2 | 7/2018 | Kao et al. |
| 2004/0150535 | A1 * | 8/2004 | Sun .......................... G06F 3/023 341/22 |
| 2005/0210417 | A1 * | 9/2005 | Marvit .................... G06F 3/017 715/863 |

(Continued)

Primary Examiner — Reginald A Renwick
(74) Attorney, Agent, or Firm — Vedder Price P.c.

(57) ABSTRACT

The present disclosure generally relates to a system and method for capturing, replaying, and modifying data inputs and methods of using the same, and it specifically relates to a system and method adapted for capturing, replaying, editing, and modifying controller inputs to a video game system and a method of using the same in connection with generating scripted video sequences using an in-game rendering engine.

18 Claims, 13 Drawing Sheets

(56) References Cited

U.S. PATENT DOCUMENTS

| | | | | |
|---|---|---|---|---|
| 2005/0210418 A1* | 9/2005 | Marvit | G06F 3/0346 | 715/863 |
| 2005/0216867 A1* | 9/2005 | Marvit | G06F 1/1694 | 715/863 |
| 2006/0007151 A1* | 1/2006 | Ram | G06F 3/038 | 345/163 |
| 2006/0084504 A1* | 4/2006 | Chan | A63F 13/215 | 463/39 |
| 2006/0132447 A1* | 6/2006 | Conrad | G06F 3/03543 | 345/168 |
| 2006/0152495 A1* | 7/2006 | Gombert | G06F 9/4411 | 345/172 |
| 2006/0209014 A1* | 9/2006 | Duncan | G06F 3/04883 | 345/156 |
| 2007/0073940 A1* | 3/2007 | Patterson | G06F 3/0227 | 710/62 |
| 2007/0259717 A1* | 11/2007 | Mattice | G07F 17/32 | 463/36 |
| 2008/0288878 A1* | 11/2008 | Hayashi | G06F 3/04886 | 715/762 |
| 2009/0048021 A1* | 2/2009 | Lian | G06F 3/011 | 463/37 |
| 2009/0104956 A1* | 4/2009 | Kay | A63F 13/814 | 463/7 |
| 2009/0183098 A1* | 7/2009 | Casparian | G06F 3/04886 | 715/765 |
| 2009/0191968 A1* | 7/2009 | Johnson | A63F 13/10 | 463/37 |
| 2009/0291759 A1* | 11/2009 | Cox | G06F 3/04883 | 463/37 |
| 2010/0075756 A1* | 3/2010 | Roberts | A63F 13/22 | 463/39 |
| 2010/0315340 A1* | 12/2010 | Wolff-Peterson | G06F 3/0482 | 345/163 |
| 2011/0021269 A1* | 1/2011 | Wolff-Peterson | A63F 13/85 | 463/29 |
| 2011/0084904 A1* | 4/2011 | Tan | G06F 3/0238 | 345/163 |
| 2011/0086706 A1* | 4/2011 | Zalewski | A63F 13/335 | 463/36 |
| 2011/0136568 A1* | 6/2011 | Buhr | A63F 13/22 | 463/29 |
| 2011/0256928 A1* | 10/2011 | Dobyns | A63F 13/44 | 463/36 |
| 2011/0307100 A1* | 12/2011 | Schmidtke | G06Q 10/06 | 700/276 |
| 2012/0071244 A1* | 3/2012 | Gillo | A63F 13/00 | 463/42 |
| 2013/0143654 A1* | 6/2013 | Aronzon | G06F 40/58 | 463/35 |
| 2013/0196765 A1* | 8/2013 | Wolff-Petersen | A63F 13/21 | 463/36 |
| 2013/0215116 A1* | 8/2013 | Siddique | G06Q 20/204 | 345/420 |
| 2014/0357370 A1* | 12/2014 | Soelberg, III | A63F 13/213 | 463/37 |

* cited by examiner

SYSTEM AND METHOD FOR CAPTURING, REPLAYING, AND MODIFYING DATA INPUTS AND METHODS OF USE THEREOF

CROSS-REFERENCE TO RELATED APPLICATIONS

The present utility patent application claims priority to and the benefit of U.S. Provisional Patent Application Ser. No. 62/915,748, filed Oct. 16, 2019, the contents of which are incorporated by reference herein in their entirety.

FIELD OF THE INVENTION

The present disclosure generally relates to a system and method for capturing, replaying, and modifying data inputs and methods of using the same, and it specifically relates to a system and method adapted for capturing, replaying, editing, and modifying controller inputs to a video game system and a method of using the same in connection with generating scripted video sequences using an in-game rendering engine.

FIELD OF THE INVENTION

A typical consumer-grade video game system comprises a display (e.g., a computer monitor, television, or home projector) coupled to a game system, which may be a specialized device such as a Microsoft® Xbox® or a Sony® PlayStation® or a general-purpose computing device such as a personal computer (PC). A user provides inputs to the game system using one or more controllers, which may be specialized for use with the game system (such as the DualShock 4 used with the PlayStation®) or general-purpose inputs such as a mouse and a keyboard. The game system receives those inputs directly, processes them, and then shows the video game to the user on the display. A typical controller may include two analog sticks, a direction pad or d-pad, and 10 or more buttons that are used to operate the video game. In addition, controllers may be configured to collect information regarding the number of times that a button is pressed or the orientation of the controller.

In a complex game, a player has a substantial number of actions available, which can require the player to operate one or more of the controller's inputs simultaneously or with precise timing. Thus, in order for a player to effectuate a certain movement or action in the video game, the player must operate a number of controls with a particular timing in a predetermined sequence. Where multiple players are involved and are attempting to interact with one another in the video game, each is required to utilize the same degree of precision to coordinate his or her actions. Even for players who are expert in the use of the controller or in playing a particular game, it may be challenging to perform a complex sequence on demand or multiple times.

Often, video game creators wish to demonstrate their video games to prospective customers in order to promote the sales of their games. To do this, video game creators prepare trailers or advertisements in the form of video footage that relates to the video game. This video footage may be generated (or "pre-rendered") using a system that is more powerful than the actual video game system that will be used by consumers to run the game, essentially creating a cinematic rendering or film depicting characters or events that may be present in the game. This allows the creator to have complete control over the footage. However, such pre-rendered footage often bears little resemblance to the graphics or performance that players will encounter while actually interacting with the video game running on their own video game system.

To avoid these concerns, it is desirable to record actual in-game footage of the video game that was generated by the video game system on which the game was designed to run. Such footage allows prospective customers to gain an understanding of their own experience playing the video game at home. However, using in-game footage creates challenges for the director of the trailer, who must attempt to coordinate the actions of one or more players who are using only the standard controllers of the video game systems. For trailers that require multiple shots or takes, the players must repeatedly provide desired inputs, often with split-second timing. A single trailer may require multiple players to each provide thousands of separate commands to the video game system in real time using the video game system's controller. As a result, it can be difficult, time consuming, and costly to prepare professional-quality video game trailers depicting a significant amount of in-game footage.

Accordingly, there exists a need for an improved system and method for interacting with a video game system to allow operators to repeatedly provide desired inputs with split-second timing. The system and methods described in the present disclosure address the drawbacks described above.

BRIEF DESCRIPTION OF THE DRAWINGS

Certain embodiments are shown in the drawings. However, it is understood that the present disclosure is not limited to the arrangements and instrumentality shown in the attached drawings.

DETAILED DESCRIPTION

Figure 1:
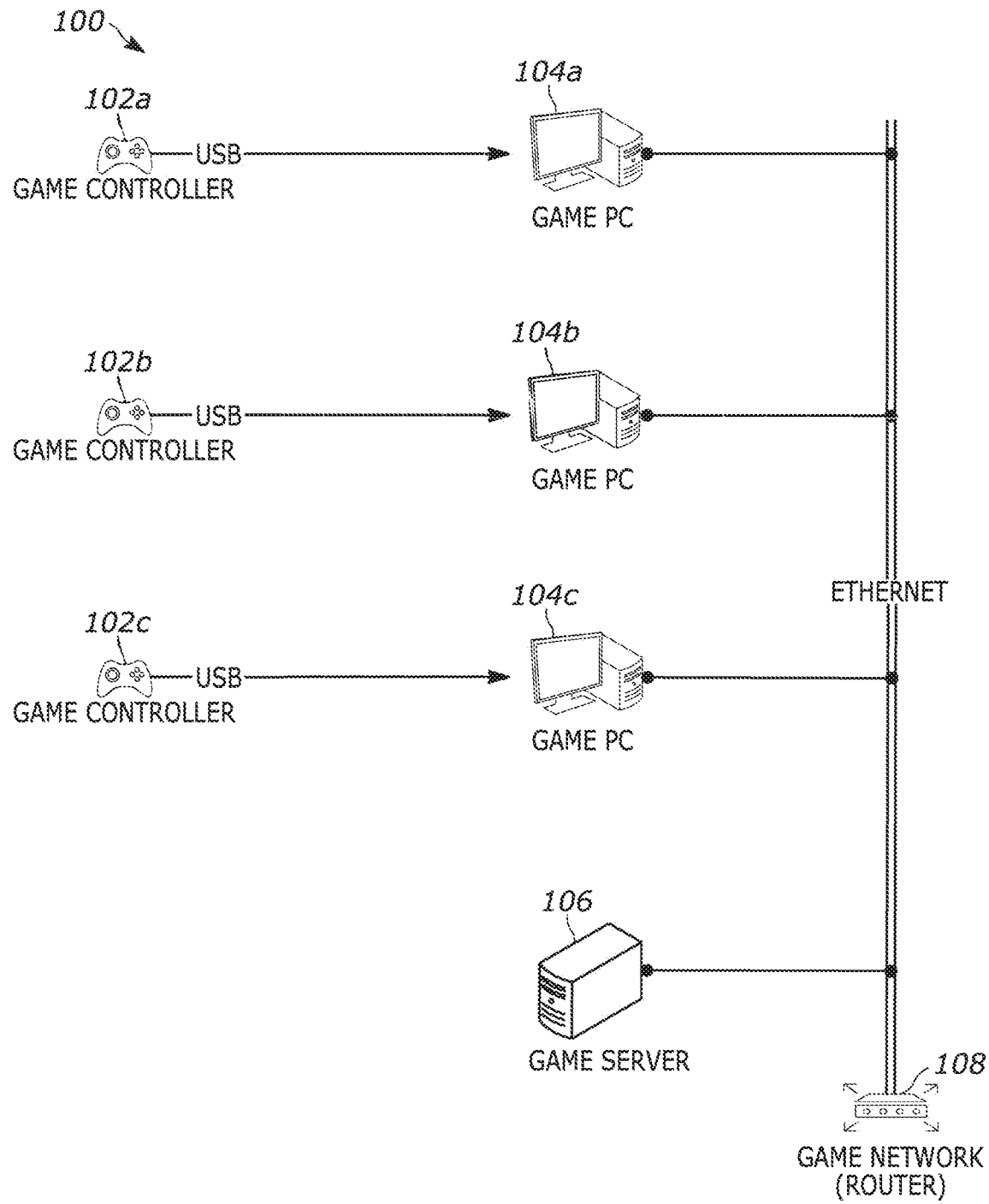
FIG. 1 is a system diagram of a prior-art video game network.

For the purposes of promoting and understanding the principles disclosed herein, reference is now made to the preferred embodiments illustrated in the drawings, and specific language is used to describe the same. It is nevertheless understood that no limitation of the scope of the invention is hereby intended. Such alterations and further modifications in the illustrated devices and such further applications of the principles disclosed and illustrated herein are contemplated as would normally occur to one of skill in the art to which this disclosure relates.

Using Video Game Systems to Create Video Game Trailers

FIG. 1 illustrates a typical video game system 100. In the illustrated system 100, three separate individuals (not shown) each use a separate game controller 102. Each game controller 102 is connected to a separate gaming device 104. As shown, gaming device 104 may comprise a personal computer with a display and a computing device configured to run a video game. The display may be integrated with the computer device (as with laptops and tablet computers) or may be a separate unit. Alternatively, gaming device 104 may be a dedicated video game console or another computing device adapted via software to run a video game, including but not limited to through the use of a headset or "virtual reality" display. The video game may either be run locally (such that the gaming device 104 executes code to generate visuals, process commands, etc.) or remotely (such that the gaming device 104 functions as a terminal that merely relays commands to a remote server and displays visuals generated by the remote server). Each game controller 102 may be connected to a respective game device 104 using a wired connection (such as a universal serial bus or USB connection) or a wireless connection (such as Bluetooth™). Alternatively, multiple players may participate in the video game using a single gaming device 104 by each connecting his or her individual controller to the single shared gaming device 104.

As shown, the gaming devices 104 are in turn connected to a game server 106 via an Ethernet network managed by a router 108 forming a local area network (LAN). As will be clear to one of skill in the art, the gaming devices 104 may be connected via a single LAN to the game server 106 (as shown). Alternatively, the gaming devices 104 may be located in a geographically remote location from the gaming server 106 and/or one another and may be connected to one another and/or the game server 106 via one or more communication links, including but not limited to wide area networks (WANs) such as the Internet and/or one or more LANs. Further, some or all of the connection between the gaming devices 104 and the game server 106 may be wireless or utilize an alternative wired technology (such as fiber optic cabling) To allow the players to interact with one another in the video game, information is sent from each separate gaming device 104 to the game server 106. Alternatively, the gaming devices 104 may communicate directly with one another without relying upon a separate game server 106.

While in use, each player views the video game on the display associated with his or her respective gaming device 104. The players each provide inputs to the video game using their respective game controllers 102. Each player may control a separate character in the video game, and the players may coordinate their actions to cause a desired series of events to occur in the video game. The players may communicate with one another outside of the video game (e.g., by speaking to one another directly or using a separate communication system such as a cellular network) or inside the game (e.g., by using headsets connected to their respective game devices to allow them to utilize the chat feature associated with the video game or the video game systems).

In the context of creating footage for a video game trailer, the players must coordinate their inputs to their respective gaming devices 104 to cause a desired series of events to occur in the video game itself. The players may be managed by a director (not shown), who does not participate in the game directly but instead instructs the players on their roles before, during, and after the footage is recorded. One or more of the players may act as "camera operators," with their screens recorded such that their perspective may be used as the view for the recorded footage. The remaining players may serve as "actors" (with their in-game characters appearing in the footage) or as "crew" (with their in-game characters not appearing in the footage, but the results of their actions being visible in the footage). The players may all follow a predetermined script that dictates the actions that must be taken and the order in which the actions must occur in the video game in order to obtain the desired footage.

When using such a video game system 100 to create a video game trailer, each player may need to input thousands of discrete instructions to his or her video gaming device 104 using his or her respective game controller 102. If even one of these instructions is incorrect (e.g., because a player presses the wrong button, presses buttons in the wrong sequence, presses buttons at the wrong time, or applies an incorrect amount of pressure to one of the controls), the entire sequence may need to be restarted.

The Burn Box™ Input Controller

Figure 2:
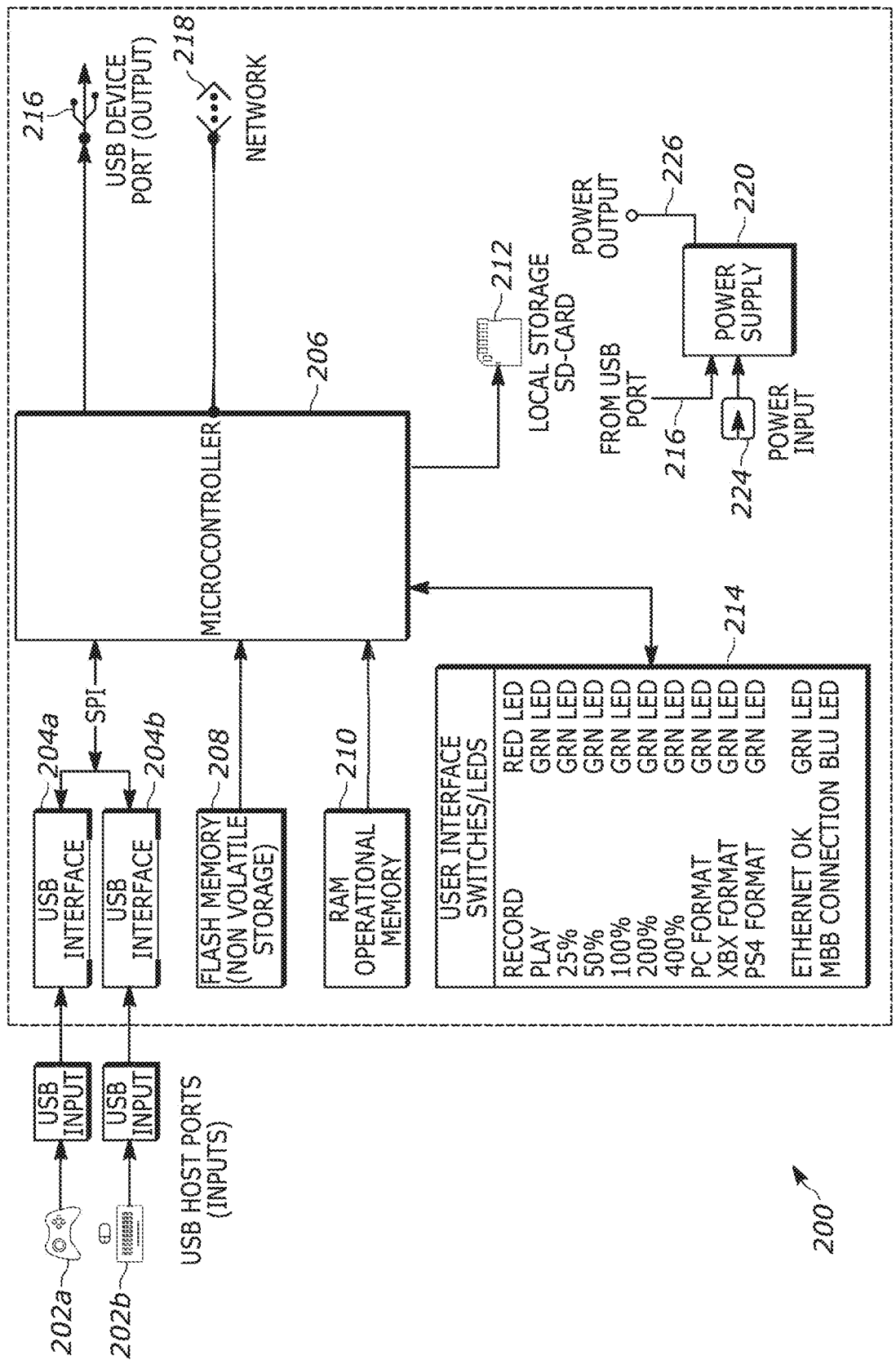
FIG. 2 is a system diagram of a control device in accordance with a first embodiment of the present disclosure.

Devices and methods in accordance with embodiments of the present disclosure provide a specialized device termed an "input controller" 200 (and also referred to herein as a "Burn Box™ input controller" or "Burn Box™"). As shown in FIG. 2, in an embodiment input controller 200 is connected to one or more input devices 202 such as a game pad 202a (such as an Xbox® controller) and/or a mouse and keyboard 202b. In the embodiment shown, each input device 202 is connected to the input controller 200 using a wired connection such as a USB connection 204a, 204b. A wired connection generally provides advantages such as lower latency and less interference. However, in alternative embodiments, wireless connections may be used instead or in addition to the wired connection.

The input controller 200 includes one or more input interfaces 204, each adapted to communicate with a discrete input device 202. In the embodiment shown, the input interfaces 204a, 204b are USB interfaces; the input interfaces 204 are communicatively coupled to one or more input devices 202 as well as to the microcontroller 206. The connection to the microcontroller 206 is shown as being a serial peripheral interface (SPI); however, as will be clear to one of skill in the art, other suitable communication interfaces may also be used. In alternative embodiments, the input interfaces 204 may utilize any wired or wireless connectivity protocol used by the video gaming device 104 to communicate with input devices 202.

The microcontroller 206 utilizes random access memory (RAM) 210 as operational memory and executes instructions stored in non-volatile, persistent on-board storage 208 (which may be flash memory or any other suitable non-volatile memory) and/or removable storage 212 (e.g., a secure digital or SD-format card or removable hard drive). Additionally, the microcontroller 206 stores information (such as inputs collected while in the "record" mode discussed below) to either the on-board storage 208 or the removable storage 212.

In embodiments, the input controller 200 includes a control panel 214 providing a user interface. In the embodiment shown, the control panel 214 comprises a plurality of light-emitting diodes (LEDs) configured to provide status information to the player using the input controller 200. As shown, the LEDs on the control panel 214 are adapted to indicate the mode of the input controller 200 ("record," "play," or "passthrough"), the speed at which the input controller 200 is outputting instructions (25%, 50%, 100%, 200%, or 400%), the format of instructions being output by the input controller 200 (e.g., PC, Xbox, or PlayStation 4), and the connectivity status of the input controller 200 (e.g., whether the input controller 200 is connected to the game network via Ethernet and/or connected to the control network). In an embodiment, some modes are indicated by the illumination of one or more LEDs (e.g., while in the play mode, a specific green LED is illuminated and in the record mode, a specific red LED is illuminated) while other modes are indicated by the lack of illumination of LEDs (e.g., the passthrough mode is indicated by the lack of illumination of either the play LED or the record LED). As will be clear to one of skill in the art, in alternative embodiments, other forms of the control panel 214 may be used including but not limited to a touch screen, a display coupled with keys, or voice controls which serve to communicate information to the user and control the mode of operation of the input controller 200.

In embodiments, the control panel 214 further comprises devices for receiving commands from a user to control the operation of the input controller 200. In the embodiment shown, the control panel 214 comprises one or more physical buttons or switches configured to enable a user to select a mode of operation for the input controller 200. In this embodiment, these buttons correspond to the functions shown on the LEDs 214. For example, to select the "record" mode, a user presses the button labeled "record." Once the input controller 200 has entered the "record" mode, the red "record" LED illuminates. To switch to "play" mode, the user need only press the button labeled "play"; the green "play" LED is then illuminated once the input controller 200 has switched modes. Similar buttons may be used to cause the input controller 200 to enter quarter-speed (25%), half-speed (50%), regular-speed (100%), double-speed (200%), or quadruple-speed (400%) modes. These modes control the speed at which commands are output to the game device 104 (while the speed of recording remains unaffected). In an embodiment, a user may utilize a button or a switch to indicate the game device format (e.g., PC, Xbox, or PlayStation 4) being used; alternatively, the input controller 200 may be configured to automatically detect the appropriate format for the game device used with the input controller. The input controller 200 may further comprise a power switch configured to activate and deactivate the input controller 200.

Other control structures are also contemplated. In an embodiment, the control panel 214 comprises a touch screen that both displays the status of the input controller 200 and enables a user to control the operation of the input controller 200. For example, when a recording is being played from the first memory slot, an icon for the first memory slot may be highlighted along with a separate icon indicating that playback is in process. Playback may be initiated by selecting the "playback" icon, causing it to be highlighted to reflect the current mode of operation.

The input controller 200 includes an output interface 216, which connects the input controller 200 to a video gaming device 104. In the embodiment shown, the output interface 216 comprises a USB port. In an alternative embodiment, the output interface 216 may utilize any wired or wireless connectivity protocol used by the video gaming device 104. The input controller 200 also includes one or more network connections 218. As shown (and as discussed in greater detail below), the network connection 218 utilizes a standard network interface (e.g., Ethernet) to connect to a proprietary network (here, termed the "BB Network"). In alternative embodiments, the network connection may either be a proprietary format or employ another standard wired (e.g., powerline or Multimedia over Coax Alliance (MOCA)) or wireless (e.g., WiFi) connection.

The input controller 200 includes a power supply 220 that may be integrated into the same physical housing as the input controller 200. Alternatively, the power supply 220 may be physically separate from the input controller 200 and attached via an electrical connection. In the embodiment shown, the power supply 220 is adapted to receive power either as a direct current (DC) power input (such as from USB port 216) or alternating current (AC) power input 224 (such as from mains power). The power supply 220 is configured to convert AC voltages to desired output DC voltages and convert input DC voltages to desired output DC voltages for use by the input controller 200. The power supply 220 supplies DC power at output terminal 226 for use by the other powered components of the input controller 200.

In use, the input controller 200 is connected to a standard gaming device 104 using output interface 216 (e.g., via a USB cable, another wired format, or a wireless connection). One or more input devices 202 are then connected to the input controller 200 via input interface 204. In an exemplary embodiment, the input device 202 communicates with the game device 104 and/or the input device(s) 202 and determines the appropriate format to use (e.g., PC, Xbox, or PlayStation 4) for the gaming device 104 to which it is connected. In an alternative embodiment, the user must indicate the desired format.

In an embodiment, the input controller 200 begins in a neutral "passthrough" or "passthru" mode whereby options selected on the input device 202 are passed directly through to the gaming device 104 without any modification by the input controller 200. This allows a user to configure the video game without needing to disconnect the input controller 200 from the input device 202, connect the input device 202 to the gaming device 104, and then reattach the input device 202 to the input controller 200.

At any time during use, a user can select the "record" mode, at which point the input controller 200 goes into "record ready" mode and blinks the record LED. Thereafter, as soon as any controller data is received from the controller 202 (e.g., the user presses any button, moves any joystick, or otherwise causes the controller to transmit information-such as, for controllers configured to detect a change in orientation or position, simply moving the controller), the input controller 200 will begin logging all inputs received from the input device 202 to memory (e.g., on-board storage 208 and/or removable storage 212) and turn on record LED 214 with a solid light. When a recording is complete, the user can press the record button again to indicate the end of recording. If data has been recorded, the play LED will begin to blink indicating that the device is ready for playback.

Similarly, at any time during use a user can select the "playback" mode, at which point the input controller 200 will begin playing back a set of inputs stored in memory (on-board storage 208 and/or removable storage 212). In an embodiment, the user can elect to "override" the recorded inputs temporarily simply by using the input devices 202 (e.g., game pad 202a or mouse and keyboard 202b). Upon receiving a command from a connected input device 202 while in playback mode, the input controller 200 will send the game system 104 the commands it receives in "real time" from the input device 202 (effectively "replacing" the recorded inputs stored in memory that correspond to the same time periods as "real time" inputs are received). As soon as those real time inputs from the input device 202 are no longer received, the input controller 200 will revert to transmitting the recorded inputs in memory. In this way, a user of the input controller 200 can record a series of actions and then make real time adjustments. For example, if the recorded inputs include a jump that was slightly too early, the user can override the recorded jump command by pressing the jump button slightly earlier while in playback mode. This also permits a user to react to unexpected events while in playback mode, while still having the ability to continue with recorded commands after addressing the unexpected situation. Should the user no longer wish to continue playing back recorded commands, the user can either continue providing "real time" inputs or can terminate playback mode (causing the input controller 200 to return to pass through mode).

Figure 3:
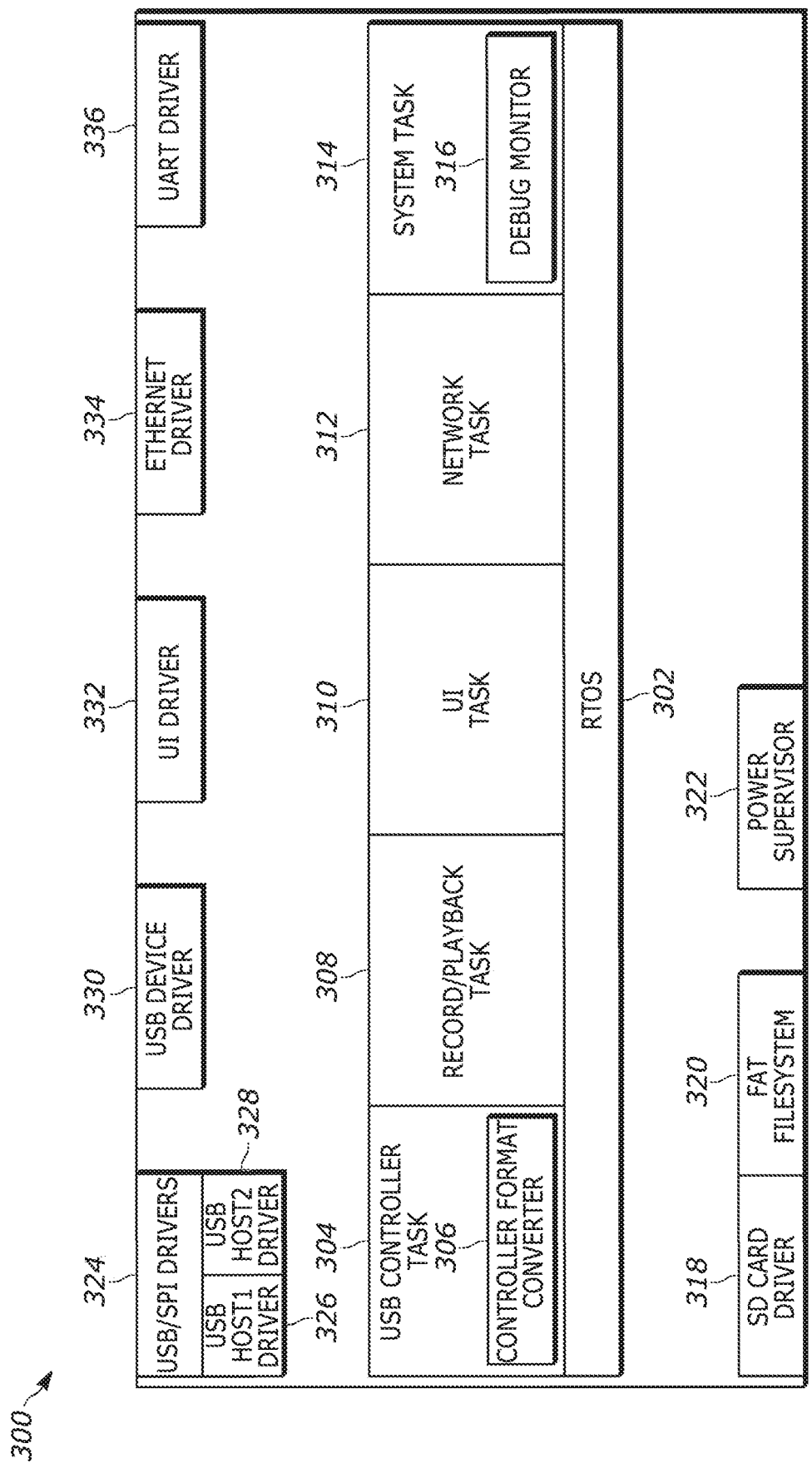
FIG. 3 is an illustration of the firmware architecture of the control device of FIG. 2.

FIG. 3 is a diagram depicting components of firmware 300 that are executed by the microcontroller 206 in an exemplary embodiment. As noted above, the firmware 300 may be stored in non-volatile, persistent on-board storage 208.

In the embodiment shown, the firmware comprises a real-time operating system (RTOS) 302 configured to process data as it arrives (i.e., in "real time"). The firmware 300 includes the following core modules, each of which is called and managed by the RTOS 302: (i) the USB controller module 304 (which includes a controller format converter module 306); (ii) record/playback task module 308; (iii) user interface (UI) task module 310; (iv) network task module 312; and (v) system task module 314 (which includes a debug monitor module 316).

In addition to the core modules, the firmware 300 further comprises a number of ancillary modules that are also called and managed by the RTOS 302. Removable driver 318 (shown here as an SD-format card driver) controls access to any removable storage attached to the input controller 200, and works with a filesystem driver 320 (here, a driver for the FAT filesystem) to access information stored on the removable storage. Power supervisor module 322 monitors and controls the power supply 220. One or more input drivers 324 (shown as USB/SPI drivers) intermediate communications with input devices 202. Separate host drivers 326, 328 (shown as USB Host1 driver and USB Host2 driver) may be used for each separate input device 202. Output driver 330 (shown as a USB device driver) intermediates communications with the gaming device 104. User interface (UI) driver 332 controls the LEDs 214 or other display used to convey status information to a user of the input controller 200. Network driver 334 (shown as an Ethernet driver) intermediates communications with the one or more network connections 218. Universal Asynchronous Receiver/Transmitter (UART) driver 336 manages the transmission and reception of data serially and asynchronously with other devices.

Use of the Burn Box™ Input Controller

Figure 4:
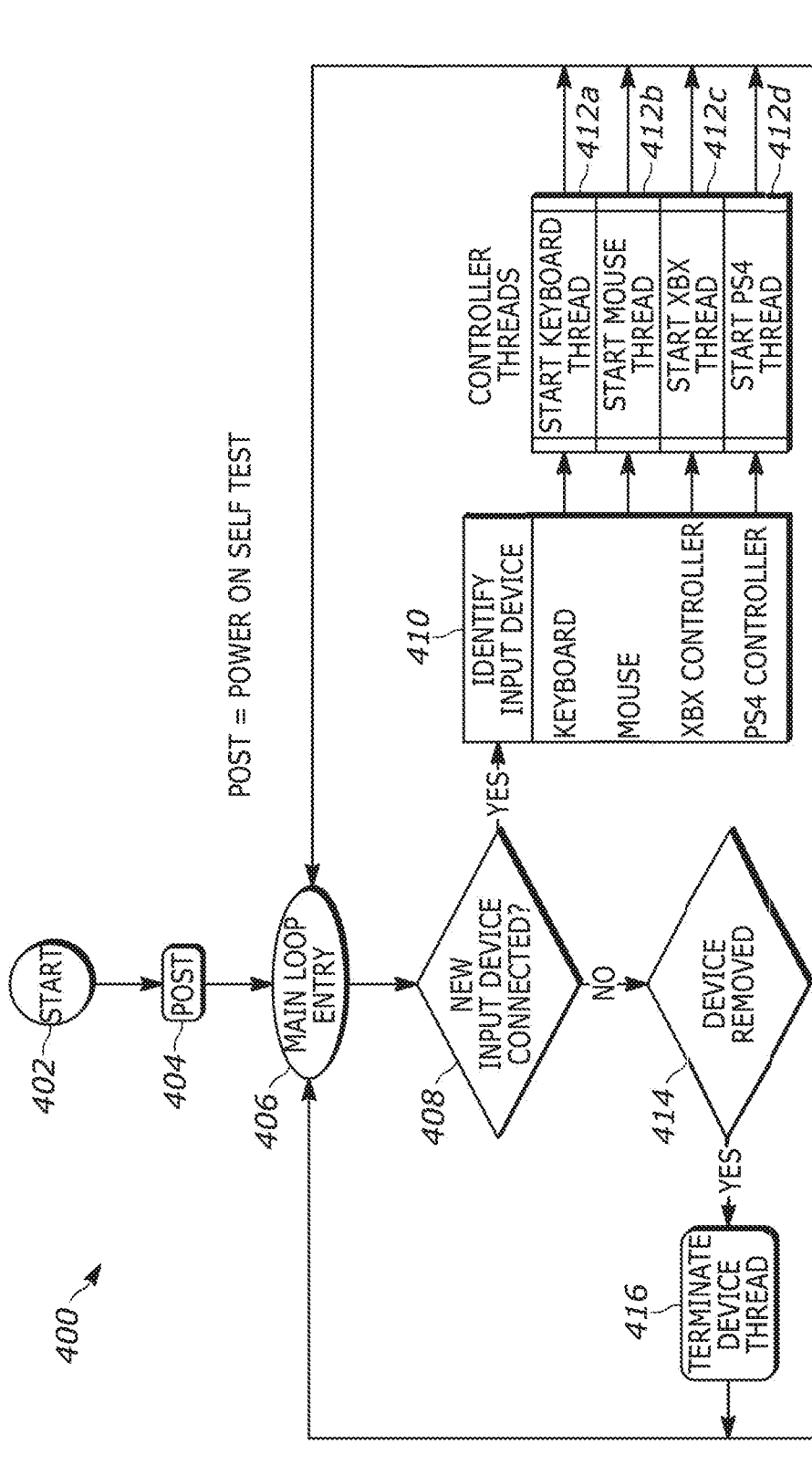
FIG. 4 is a flowchart depicting a method of operating the firmware of FIG. 3.
Figure 4:
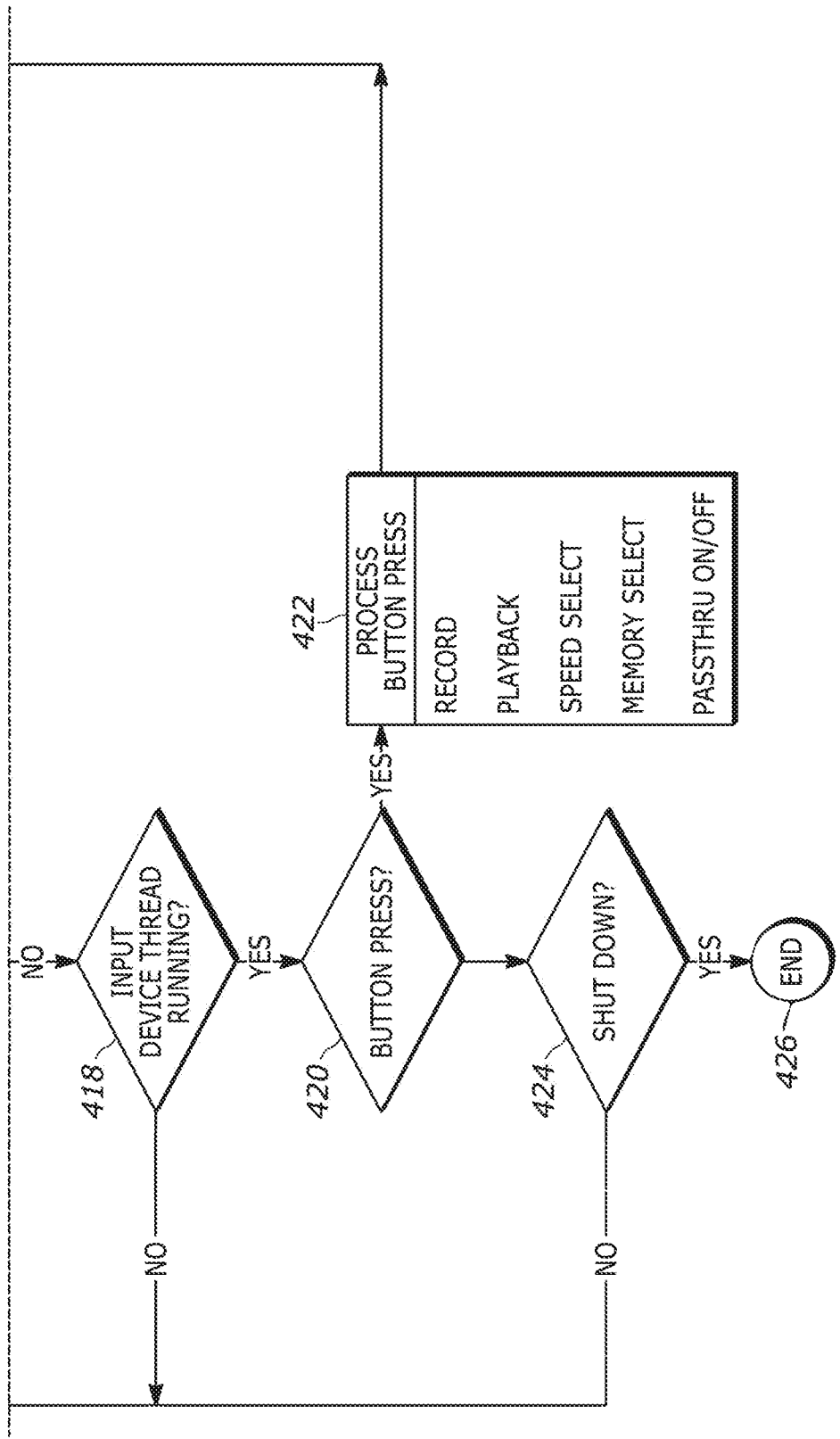

FIG. 4 is a flowchart illustrating a method 400 of operating the firmware 300 in an exemplary embodiment. The process begins at step 402 when the input controller 200 is powered on (e.g., by pressing a power switch or connecting the input controller 200 to a power source). The input controller 200 begins by conducting a power on self-test (POST) at step 404. If the POST fails, the input controller 200 shuts down. Otherwise, if the POST passes successfully at step 404, the main execution loop begins at step 406. First, a check is conducted at step 408 to determine whether a new input device 202 has been connected to the input controller 200. If so, at step 410 the new input device is identified (e.g., as a keyboard, mouse, Xbox controller, or PlayStation 4 controller) and the appropriate controller thread 412 (e.g., keyboard thread 412a, mouse thread 412b, Xbox controller thread 412c, or PlayStation 4 controller thread 412d) is initiated. Once execution of the appropriate controller thread 412 is completed, the method returns to the main loop entry step 406.

Otherwise, if a new device has not been connected at step 408, the method proceeds to check if a device has been removed at step 414. If so, the controller thread 412 pertaining to the removed device is terminated at step 416, and the method returns to the main loop entry 406.

If a new device has not been removed, a check is conducted to determine whether any controller threads 412 are currently active (i.e., whether any input devices 202 are currently connected to the input controller 200). If no devices are connected, the method returns to the main loop entry step 406.

If one or more input devices 202 are connected (i.e., one or more associated controller threads are operating), the method proceeds to check if any data has been received from the buttons or switches on the input controller 200 itself. If so, the appropriate action is taken at step 422: (i) if the "record" button is pressed, the input controller 200 either enters record mode (if not currently in record mode) or terminates record mode (if currently in record mode); (ii) if the "play" button is pressed, the input controller 200 either enters play mode (if not currently in play mode) or terminates play mode (if currently in play mode); and (iii) if one of the playback speeds (e.g., quarter-speed, half-speed, regular-speed, double-speed, or quadruple-speed) buttons is pressed, the input controller 200 either enters the selected playback speed mode (if not currently in the selected playback speed mode) or terminates the selected playback speed mode (if currently in the selected playback speed mode). Once the appropriate action is taken at step 422, the method returns to the main loop entry step 406.

Finally, at step 424, the input controller 200 checks if a shutdown instruction has been received (e.g., by pressing a power button). If so, the input controller 200 shuts down at step 426. In an embodiment, the input controller 200 constantly monitors for shutdown instructions and is capable of safely interrupting the current process and shutting down at any time.

Figure 5:
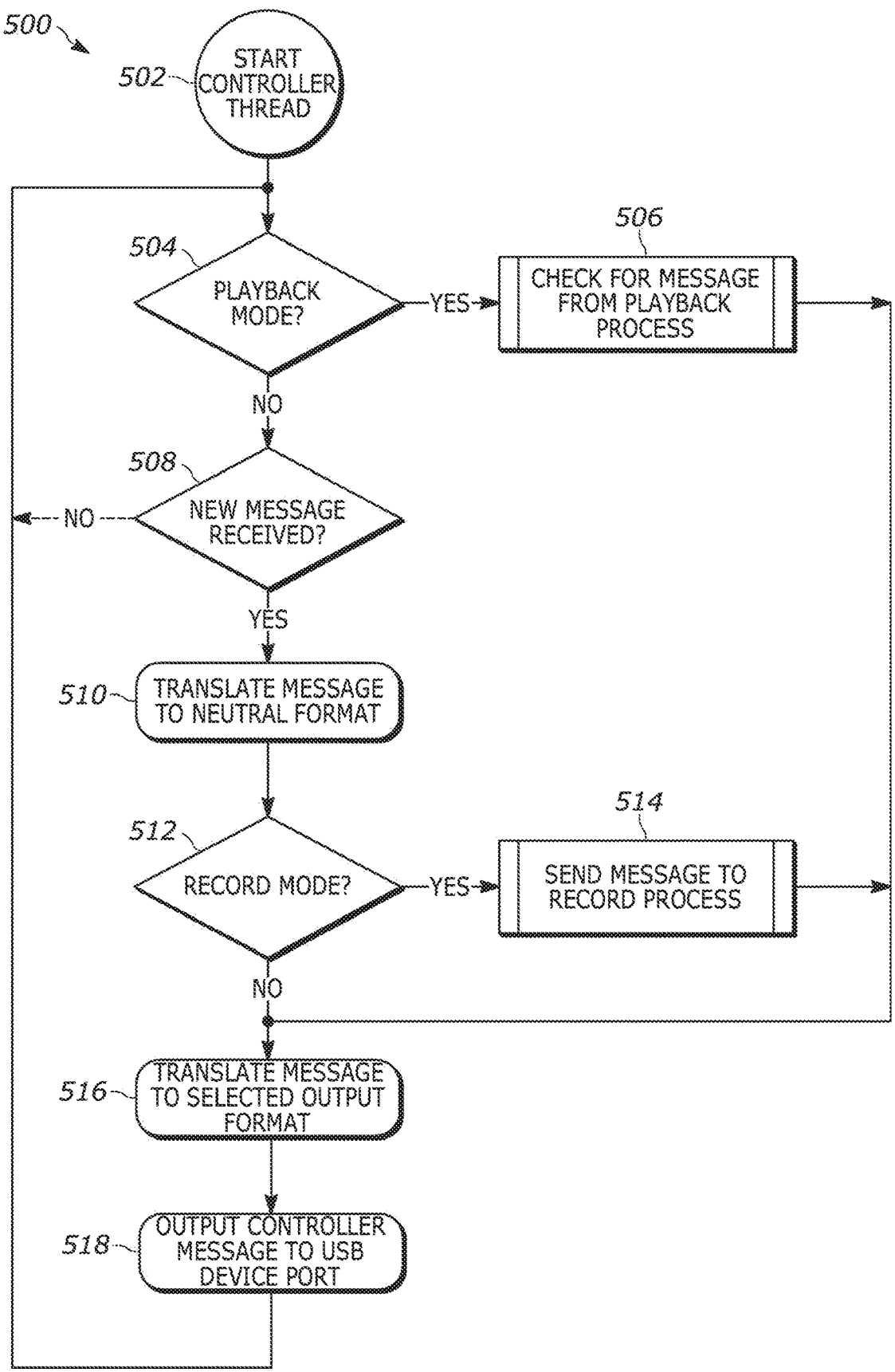
FIG. 5 is a flowchart depicting a method of receiving and recording controller inputs using the control device of FIG. 2.

FIG. 5 is a flowchart illustrating a method 500 of operating the controller thread 412 of the firmware 300 in an exemplary embodiment. The process begins at step 502 when the controller thread 412 is initiated. At step 504, the input controller 200 checks whether the playback mode is active. If so, the input controller 200 checks for messages from the playback process 700 (discussed below) at step 506. If a message is received from the playback process 700, the input controller 200 translates the method to the desired output format at step 516 before sending the translated message to the video game device 104 via the output interface 216 at step 518.

Otherwise, if the playback mode is not active (i.e., the input controller 200 is in either the "neutral" mode or the record mode), the input controller 200 checks whether a new message has been received via the input interface 204 at step 508. If a message has not been received, the method returns to step 504 and repeats. If a message has been received, at step 510 the message is translated to a neutral format that is platform-agnostic (i.e., is not specific to either any of the various video game systems or the input device with which the input controller may be used).

The use of this neutral format enables the input controller 200 to function with game controllers from one video game system while providing commands to a different video game system. For example, in an embodiment, an Xbox controller may be used with a PlayStation 4. This allows players to utilize controllers with which they are most comfortable regardless of the video game system being used. Further, storing recorded commands in a platform-agnostic format enables commands recorded using one type of game controller (or one type of video game system) to be replayed on a different video game system without compatibility concerns.

Through the use of this neutral format, the input controller 200 may be configured to present itself as any type of game controller or input device for the video game system. Many video game systems 104 will display different user interfaces (UI) based on the type of controller used with the video game system. For example, one user interface may be displayed when a game pad 202a is connected to the video game system 104, while a different user interface will display when a keyboard and mouse 202b are connected. Many video game systems do not allow a user to select which UI is displayed, and instead automatically display a UI corresponding to the type of input received (i.e., a user interface that is particular to a specific game pad, such as an Xbox controller). This creates a particular issue when creating a video game trailer, as there may be a need to ensure that a specific user interface is visible in the trailer (such as when making a trailer that is designed to feature a particular video game format or console). Previously, video game trailer creators were forced to either use the controller type that corresponded to the UI for the trailer. By instead employing an input controller 200 in accordance with the present disclosure, video game trailer creators are free to use their preferred controller type while still having the desired UI displayed on screen. This is especially advantageous as particular controller types provide advantages in different circumstances: for example, a mouse and keyboard allow for quicker turning, while a joystick allows for smoother movement. By recording inputs using different controller types at different times, a video game trailer creator can select the best controller type for the job at hand and freely change between controller types within a single trailer, all while keeping a consistent (and desired) UI displayed on screen.

At step 512, the input controller 200 checks whether the record mode is active, and if so, the message is sent to the record process 600 (discussed below) at step 514. Regardless, the method proceeds to step 516, where the message is translated to the desired output format, and step 518, where the message is sent via the output port. The method repeats until terminated (e.g., because the input controller 200 has been powered off). In an embodiment, the method 500 remains active while the main loop entry step 406 continues to execute. In an alternative embodiment, the method 500 terminates each time step 518 is completed and returns to step 406 in the main loop.

As noted above, the input controller 200 is configured such that the process executes in substantially real time, meaning there is no perceptible delay to the user operating the video game system.

Figure 6:
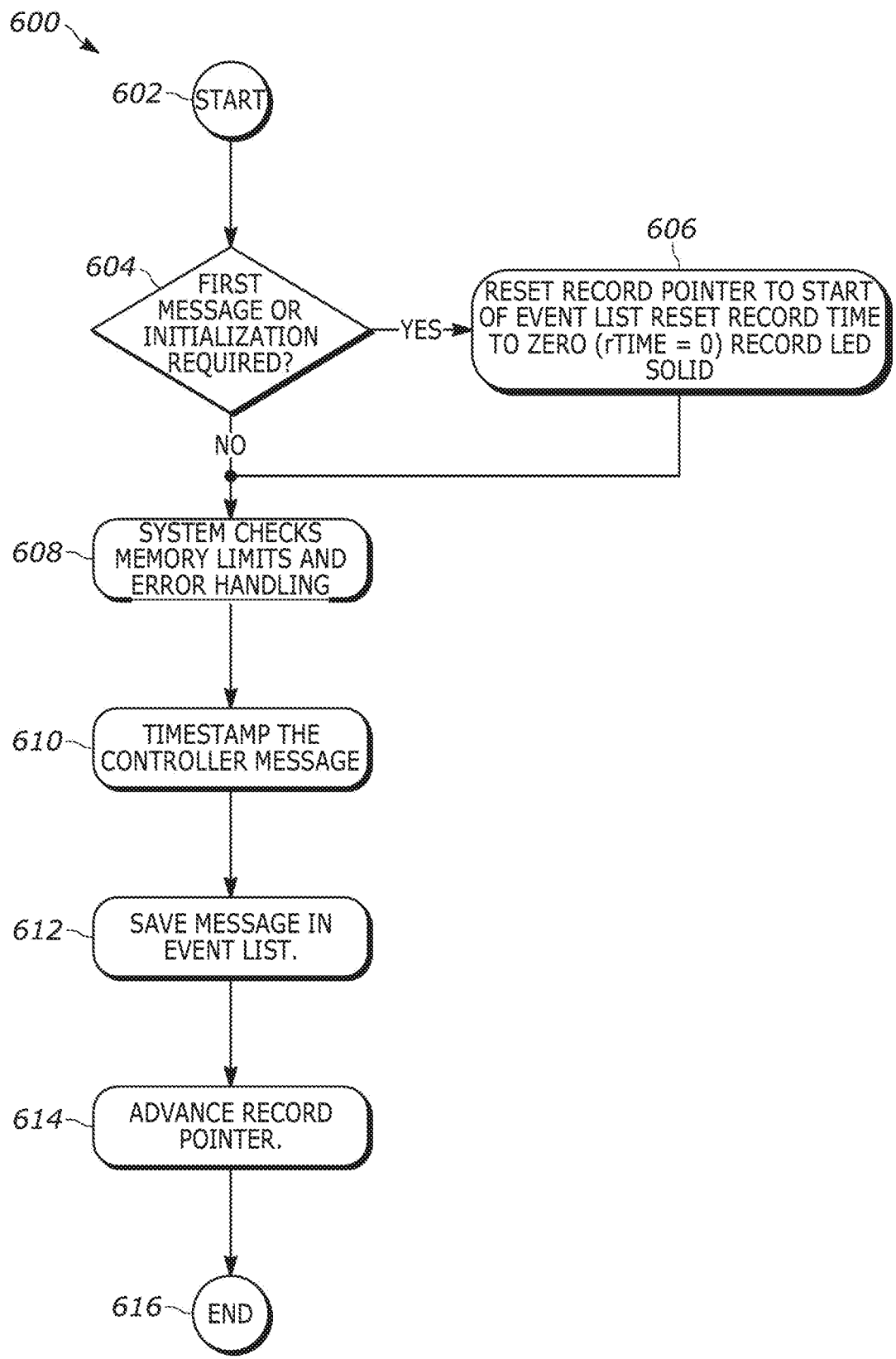
FIG. 6 is a flowchart depicting the record process of step 514 in FIG. 5.

FIG. 6 is a flowchart illustrating an exemplary embodiment of a method of operating the record process 600 initiated at step 514 above. In the record process, messages received from an input device 200 are recorded on an event list along with an associated timestamp allowing the received messages to be arranged chronologically, stored in memory (on-board storage 208 and/or removable storage 212), and later replayed in the same order—and with the same relative spacing or delay between messages—as the messages were originally received. A record pointer indicates the current location in the event list at which new messages should be saved, while a record timer records the total elapsed time from a predetermined point, namely, the moment at which the record mode was initiated. This allows a series of inputs to be precisely duplicated in the playback mode (discussed below). In an alternative embodiment, the record time is measured from the first message received from the input device, thereby allowing for an initial delay to be disregarded.

The method 600 begins at step 602, where the record process is initiated. At step 604, the input controller 200 determines whether the message received from the input device 202 is either the first message or if initialization is otherwise required. If initialization is required, at step 606, the input controller 200 resets the record pointer to the start of the event list and resets the record time to 0 (indicating the start of a new record sequence). The input controller 200 also signals to the user that the record mode is activated, for example, by illuminating the red "record" LED. At step 608, the input controller checks to ensure that sufficient free space remains in memory 210 to allow for continued recording and also checks that no errors have occurred. Errors may be issued, for example, if an input device 202 is disconnected, memory is approaching or has reached capacity, or the output device 216 is disconnected.

At step 610, the input controller 200 applies a timestamp to the message before recording the message (and the associated timestamp) to the event list in memory (on-board storage 208 and/or removable storage 212). As noted above, the firmware 300 carries out operations in real time such that the timestamp applied to the message is substantially equivalent to the time at which the message was received by the input controller 200 with no perceptible delay. At step 614, the record pointer is advanced to the next free location in memory (on-board storage 208 and/or removable storage 212) and the method 600 terminates, returning without an error to method 500.

Figure 7:
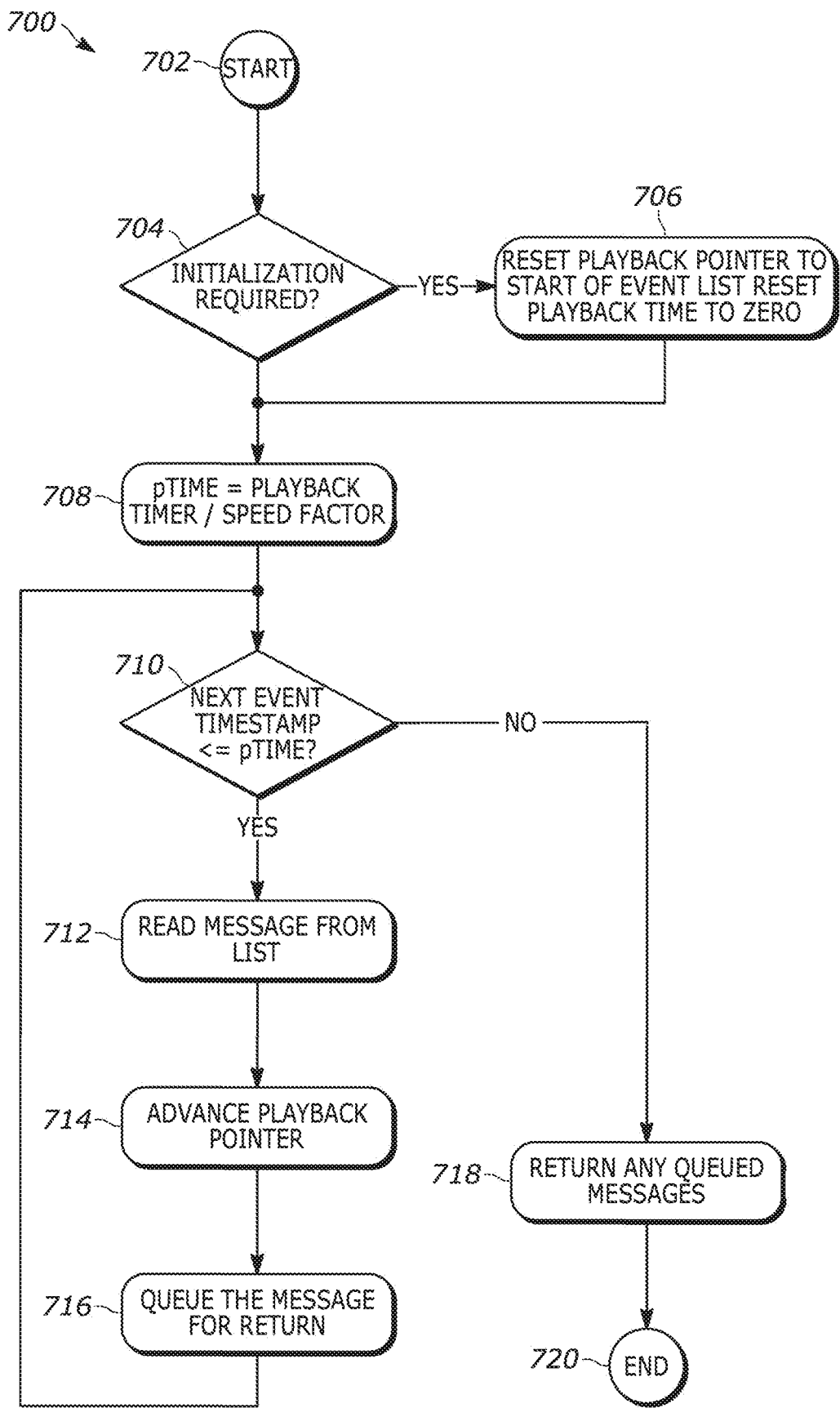
FIG. 7 is a flowchart depicting the playback process of step 506 of FIG. 5.

FIG. 7 is a flowchart illustrating an exemplary embodiment of a method of implementing the playback process 700 initiated at step 506 discussed above. In the playback process, messages are read from the event list memory (on-board storage 208 and/or removable storage 212) and processed such that the messages are output with the same relative timing as they were recorded. Depending on the specific playback mode selected by the user, the timing of the messages is scaled such that the spacing between messages is increased (e.g., because the messages are being output at a slower speed than they were recorded), maintained the same, or decreased (e.g., because the messages are being output at a faster speed than they were recorded). A playback pointer indicates the current location in the event list from which messages should be read, while a playback timer indicates the total elapsed time from a predetermined point, namely, the moment at which the playback mode was initiated.

The method 700 begins at step 702, where the playback process is initiated. At step 704, the input controller 200 determines whether the message read from memory (onboard storage 208 and/or removable storage 212) is the first message or if initialization is otherwise required. If initialization is required, at step 706, the input controller resets the playback pointer to the start of the event list and resets the playback time to 0 (indicating the start of a new playback sequence). The input controller 200 also signals to the user that the playback mode is activated, for example, by illuminating the green "playback" LED along with the green LED associated with the playback speed selected by the user. In an embodiment, where a desired playback speed is not selected, the input controller defaults to 100% and replays messages at the same speed at which they were recorded.

At step 708, the input controller 200 applies any scaling necessary for the desired playback speed. Scaling is accomplished by calculating a so-called pTime for each message, signifying the amount of time after the playback sequence is initiated scaled by the selected playback speed. The relative spacing between messages is maintained, while being adjusted by the playback speed. The current pTime is determined by dividing the playback time, i.e., the actual time elapsed since the playback sequence was initiated, by the selected speed factor. The current pTime is then compared to the timestamps stored in the event log to determine when to output each message. As multiple messages may have the same timestamps (i.e., because multiple buttons were pressed simultaneously on input device 202 during recording), the input controller 200 checks for all messages with timestamps that are less than or equal to the current pTime at step 710. For each message, the message is read from the event list at step 712, the playback pointer is advanced in the event list to the next entry at step 714, and the message is queued for return (i.e., for output) at step 716. Once there are no such messages remaining in the event log, all queued messages are returned at step 718, and the process ends at step 720. As will be clear to one of skill in the art, because the method is carried out in substantially real time, the input controller 200 must loop through the method 700 at each discrete time interval at which messages may need to be output. Accordingly, the total time required to implement the method 700 must be substantially less than the actual time required to output messages, such that messages are available for output at the correct time.

Figure 8:
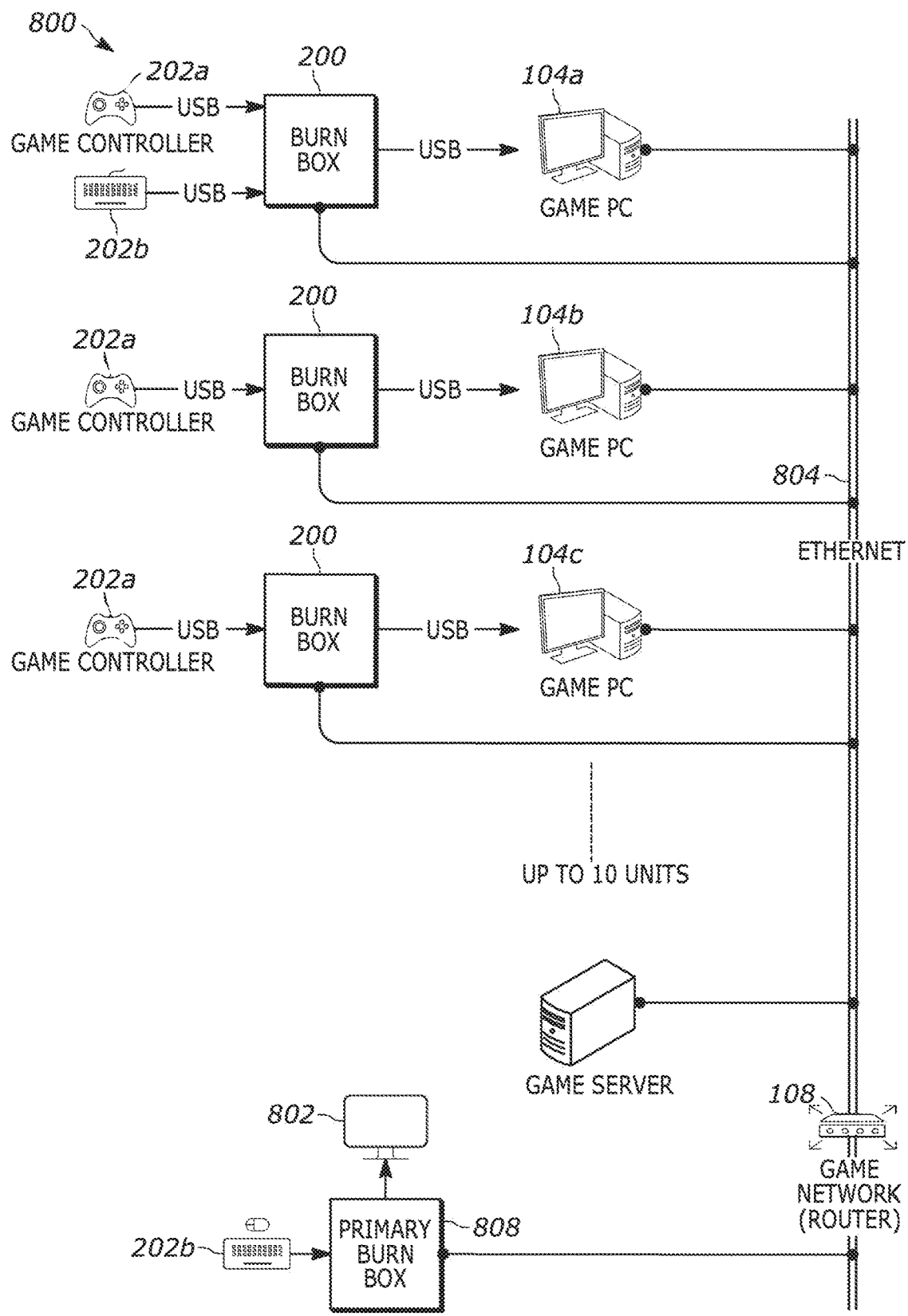
FIG. 8 is a system diagram of a system in accordance with the first embodiment of the present disclosure incorporating a plurality of the control devices of FIG. 2.

Use of a Plurality of Burn Box™ Input Controllers with a Primary Burn Box™ Input Controller FIG. 8 illustrates an improved video game system 800 including a plurality of input controllers 200 operatively coupled to a primary input controller 808 in accordance with an embodiment. In the illustrated system 800, three separate individuals (not shown) each use a separate game controller 202a and/or 202b. Each game controller 202 is connected to a separate input controller 200, which is in turn connected to a gaming device 104 (shown as game PCs 104a, 104b, 104c which each include a display and a computing device configured to run a video game or a video game client, as discussed above), which may be a dedicated video game console or a general-purpose computer adapted via software to run a video game. Each game controller 102 may be connected to the respective input controller 202 using a wired connection (such as a universal serial bus or USB connection) or a wireless connection (such as Bluetooth). Alternatively, multiple players may participate in the video game using a single gaming device 104 by connecting their separate input controllers 200 to a single gaming device 104.

As shown, the gaming devices 104 are in turn connected to a game server 106 via an Ethernet network managed by a router 108. To allow the players to interact with one another in the video game, information is sent from each separate gaming device 104 to the game server 106. Alternatively, the gaming devices 104 may communicate directly with one another without relying upon the game server 106.

A fourth individual operates a primary input controller 808 using an input device 202b, which in an exemplary embodiment is a mouse and a keyboard. In an embodiment, the primary input controller 808 is a general-purpose computer running specialized software which causes the computer to carry out the functionalities discussed herein. In an alternative embodiment, the primary input controller 808 is special-purpose hardware (which may be coupled with software). The primary input controller 808 displays information on a display 802 using a graphical user interface (GUI), as discussed below. The link between the input controllers 200 and the primary input controller 808 may be effectuated using either a wired (e.g., Ethernet) network or a wireless (e.g., WiFi) network using a known communications protocol (e.g., TCP/IP). Alternatively, the communication protocol and/or connectors and cabling used may be proprietary and specifically adapted to use with the system disclosed herein. The communications link may be bilateral, such that each input controller 200 transmits information to and receives information from the primary input controller 808.

In an embodiment, each input controller 200 transmits all inputs received from the associated game controller 202 to the primary input controller 808 during either the record mode or the neutral mode. The primary input controller 808 may send an instruction to each input controller 200 initiating or terminating either the record or the playback mode. In an embodiment, the primary input controller 808 determines the playback speed for each respective input controller 200 and transmits instructions to be played back to each respective gaming device 104. In an alternative embodiment, the messages to be played back are stored on each individual input controller 200, and the primary input controller 808 merely initiates the playback mode.

Each player may control a separate character in the video game, and the players may coordinate their actions to cause a desired series of events to occur in the video game.

While in use, each player views the video game on the display associated with his or her respective gaming device 104. During an initial setup period, the players may provide inputs to the video game using their respective game controllers 202 via their respective input controllers 200. This may be done, for example, to allow the players to practice a predetermined scenario (such as a scripted interaction for use in a video game trailer) or to allow the players to position their characters in the video game at predetermined starting points for such an interaction.

As discussed above, in the context of creating footage for a video game trailer, the players must coordinate their inputs to their respective gaming devices 104 to cause a desired series of events in the video game itself. The director may operate the primary input controller 808 so as to monitor and coordinate all of the actions of each individual player.

Once the setup for a particular interaction or "scene" is complete, the director may initiate the record mode for each of the input controllers 200 using the primary input controller 808. Each player then operates his or her respective game controller 202 so as to carry out his or her role in the scene, which may be done according to a predetermined script or other instructions provided by the director. Once the scene is completed, the director may terminate the record mode for all of the individual input controllers 200 using the primary input controller 808. If any player has successfully carried out his or her role, for subsequent repeats of the scene, that player's in-game character may be operated by the respective input controller 200 running in playback mode to avoid the need for the associated player to carry out the same sequence of inputs.

During recording, the players may move at a reduced speed, such as half-speed. This reduces the pressure associated with needing to quickly execute multiple commands in short order and allows more time for a user to think through his or her next moves and react to events occurring in the game. Once each player's inputs have been successfully recorded, the recorded inputs may be played back at a faster speed to create the necessary footage. For example, a user may control a character to walk along a tightrope in a game while recording at half speed. Subsequently, the input controller 200 may play back the commands at full-speed (causing the character to run across the tightrope). In an embodiment, the speed at which the game is run on the gaming devices 104 is adjusted such that a player can input commands as usual while still having additional time to react.

One or more of the gaming devices 104 and/or the game server 106 may operate to record the displays of the individual players. These recordings may then be edited and combined to create the video game trailer or other desired video footage. In addition, the recorded displays may be rebroadcast (such as to the director using the primary input controller 808).

Figure 9:
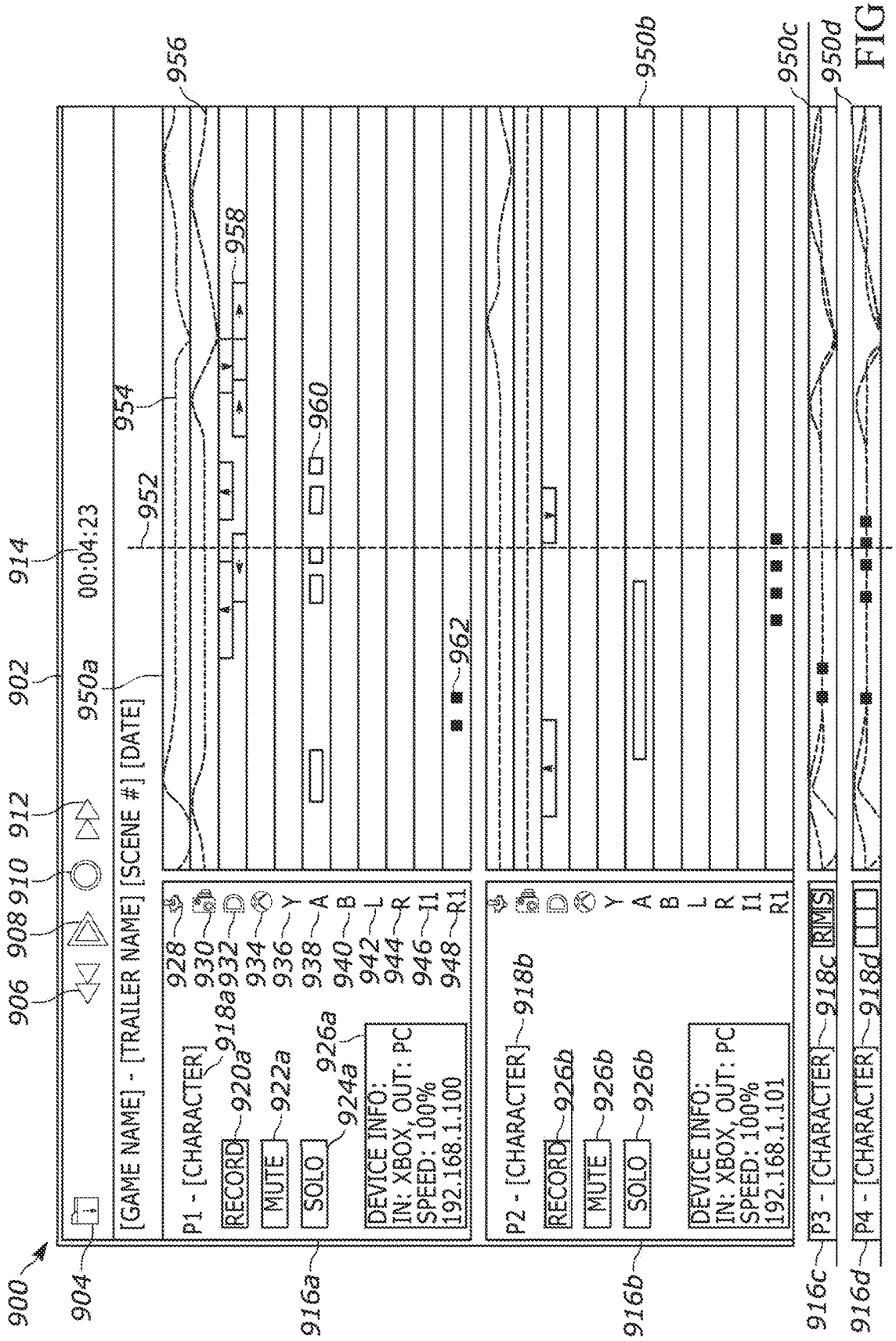
FIG. 9 is an illustration of the graphical user interface displayed to the user of the primary control device during operation.

FIG. 9 displays an exemplary embodiment of the GUI 900 presented by the primary input controller 808 during operation. As shown, the GUI 900 may include a command bar 902 featuring an option 904 for the director to save (and/or load) a given set of recorded inputs along options to rewind 906, play 908, record 910, and fast-forward 912 the recorded inputs. A time indicator 914 shows the elapsed time in a given record or playback sequence. Each separate player is represented by a discrete control panel 916 and timeline 950, with a unique indicator 918 (such as the player's name, alias, and/or video game character name) shown. One or more of the players may serve as actors while one or more of the players serve as camera operators. As shown, control panels 916a and 916b (which are associated with players 1 and 2, respectively) are shown in expanded view with the timeline for each individual bottom visible, while control panels 916c and 916d (associated with players 3 and 4, respectively) are shown in collapsed view with the symbols for each available input collapsed upon one another. With reference to the timeline 950a for player 1, each available input is shown separately. Here, each player is using an Xbox controller. With reference to player 1, the available input options are to move the analog stick 928, the camera analog stick 930, the D-pad 932, the X-button 934, the Y-button 936, the A-button 938, the B-button 940, the L-button (or Left Bumper) 942, the R-button (or Right Bumper) 944, the L1 button (or Left Trigger) 946, and the R1 button (or Right Trigger) 948. The type of command available for each button may be analog (such as for the analog sticks 928, 930) or digital (such as for the D-pad 932). In embodiments, the force with which a button is pressed may also be recorded as an analog signal or a digital representation of the original analog input. For example, the Left Trigger 946 and Right Trigger 948 may be pressure sensitive, such that the amount of pressure applied to each is recorded (as either a digital or analog signal). Each command entered by player 1 is shown on the timeline 950a either as an analog waveform 954, 956 or a series of digital inputs 958, 960, 962. A time bar 952 indicates the current moment during playback and/or recording.

For each player, the director may individually activate record mode 920. Similarly, the director may elect to play or record inputs from only one player using the "solo" button 924 or to exclude a player from either recording or playback using the "mute" button 922. The device information 926 for each player is also displayed.

The primary input controller 808 may ensure that each individual input controller 200 operates in synchronization with the others, such that each input controller 200 begins recording or playback simultaneously with the others (allowing one or more input controllers 200 to playback simultaneously as other input controllers 200 record). Synchronization may be accomplished by sending simultaneous start commands to each input controller 200.

In an embodiment, the primary input controller 808 may instruct one or more of the input controllers 200 to play back a stream of recorded commands in reverse. For example, an input controller 200 may record a sequence of actions whereby a video game avatar walks forward. These recorded inputs may then be played back in reverse, such that the video game avatar is made to walk backward. By way of example, this would allow a player acting as a camera operator in the video game to record a series of movements walking forward (such that the player can see the path to be followed on the display); by reversing these movements, the camera operator will move smoothly in reverse along the same path without having to have the in-game camera pointed in the direction of motion.

In an embodiment, the primary input controller 808 pre-loads instructions to each individual input controller 200. In an alternative embodiment, the primary input controller 808 streams instructions to each input controller 200 live.

In an embodiment, the GUI 900 is configured to allow the director to edit or rearrange the instructions for a particular player. For example, if player 1 inadvertently pressed the A-button 938 instead of the Y-button 936, the director could change the instruction to the desired Y-button 936 press. Similarly, the director could adjust the duration of a button press simply by changing the length of the corresponding instruction in the GUI 900. In this way, the director is able to fine-tune the actions of each individual video game avatar before playback through either macro or micro adjustments.

Dual-Use Input Controllers

In an embodiment, each input controller 200 is capable of both receiving commands from and sending commands to other input controllers 200. In an embodiment, a "primary mode" switch may be located on the input controller 200. While in "receive" mode, the input controller 200 is configured to receive start and stop commands to initiate and cease playback and/or record mode from another input controller 200 on the network. While in "primary mode," the input controller 200 is configured to send start and stop commands to initiate and cease playback and/or record mode to one or more input controller 200 on the network. The start command will be sent when the user of the input controller 200 in primary mode begins playback or recording, and the end command will be sent when the user of the input controller 200 in primary mode ceases playback or recording. In this way, each of the input controller 200 on the network may be synchronized precisely. In an embodiment, each individual user may select whether his or her respective input controller 200 is in playback or record mode for a given "take" and (if available) may select a memory slot from which to record or playback. In this embodiment, the input controller 200 in primary mode merely sends "start" and "end" commands, and each respective input controller in receive mode determines whether to record or playback based on the locally determined settings.

Input Controller States

Figure 10:
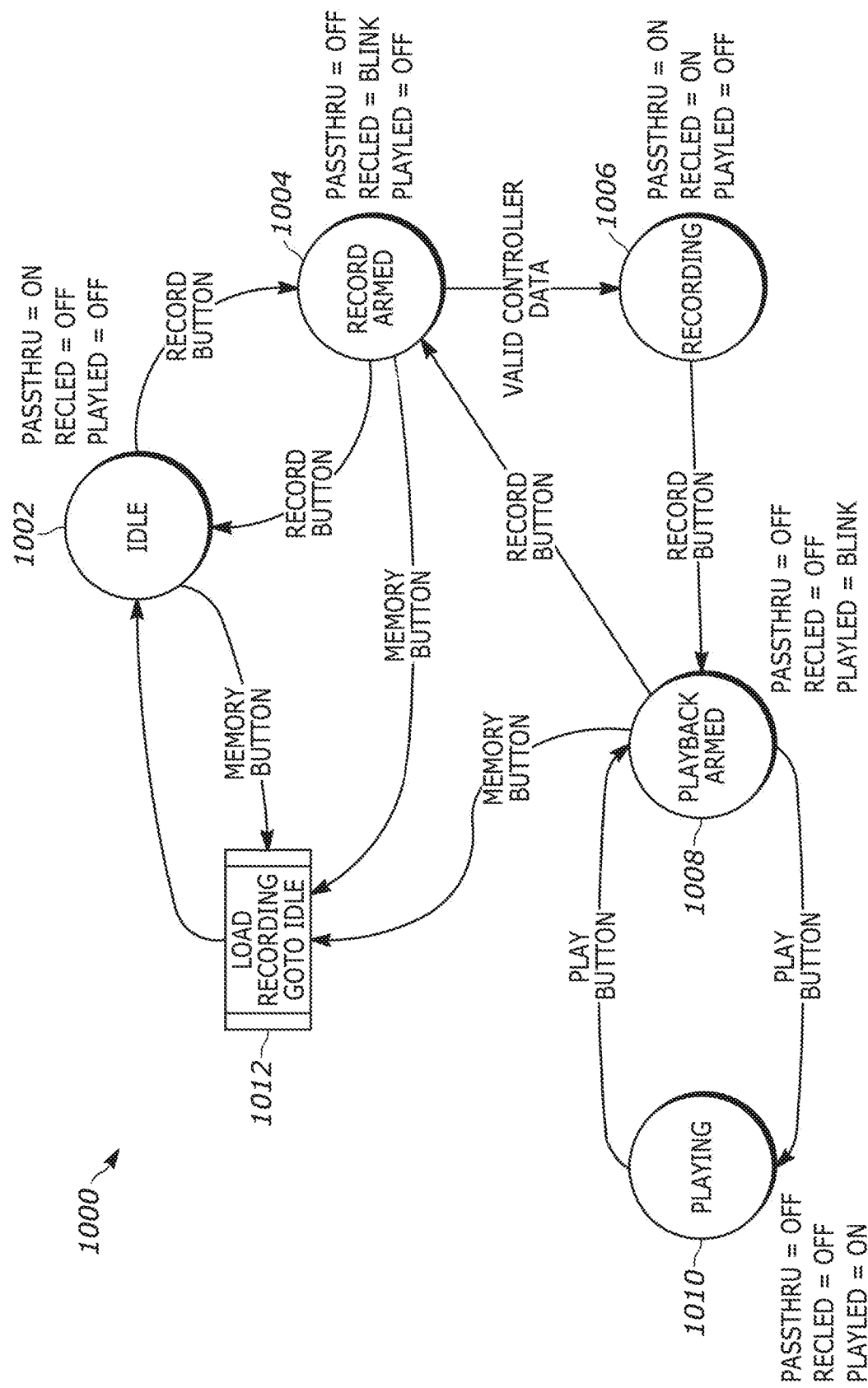
FIG. 10 is a state diagram depicting an embodiment of the modes of operation of the control device of FIG. 2.

FIG. 10 depicts an exemplary state diagram 1000 of the modes of operation of an input controller 200. Initially, the input controller 200 is in an idle state 1002 (i.e., is neither recording nor playing back controls). In this idle state 1002, the input controller 200 is in the so-called "passthrough" or "passthru" mode whereby options selected on the input device 202 are passed directly through to the gaming device 104 without any modification by the input controller 200. Neither the record LED nor the play LED are illuminated. Once the record mode is selected, the input controller 200 transitions into a record armed state 1004. Passthrough mode is disabled and the record LED blinks. As soon as valid data is received from the input device 202 (representing, for example, a button press or movement of a joystick), the input controller 200 enters a recording state 1006 wherein all input received from the input device 202 is recorded to memory and is simultaneously passed through to the video game device (i.e., passthrough mode is reenabled). In this state, the record LED remains illuminated. The input controller 200 remains in the recording state 1006 until the record button is pressed again, at which time the input controller 200 transitions to a playback armed state 1008. The recording may be saved to both persistent memory (on-board storage 208 and/or removable storage 212) as well as active memory (RAM) 210.

Once in the playback armed state 1008, the input controller 200 is prepared to playback the recording that is stored in active memory 210, indicated by the blinking of the playback LED. In this state, the input device 202 ignores inputs received from the input device 202 (i.e., passthrough mode is disabled). Once the user presses the play button, the input controller 200 enters a playing state 1010 in which the input controller 200 replays the selected recording stored in active memory 210 by transmitting the recorded controls to the video game device 104. In this state, the input device 202 continues to ignore inputs received from the input device 202 (i.e., passthrough mode remains disabled). In an embodiment, the user may press the play button while in the playing state 1010 to terminate playback and immediately return to the idle state 1002. Once playback is finished, the input controller 200 returns to the playback armed state 1008.

In an alternative embodiment (not shown), the input controller 200 returns to the idle state 1002. In this embodiment, the user can return to the playback armed state 1008 by pressing the playback button.

As shown, while in the playback armed state 1008, the user may instead return to the record armed state 1004 by pressing the record button.

Second Embodiment of the Burn Box™ Input Controller and Use Thereof

Figure 11:
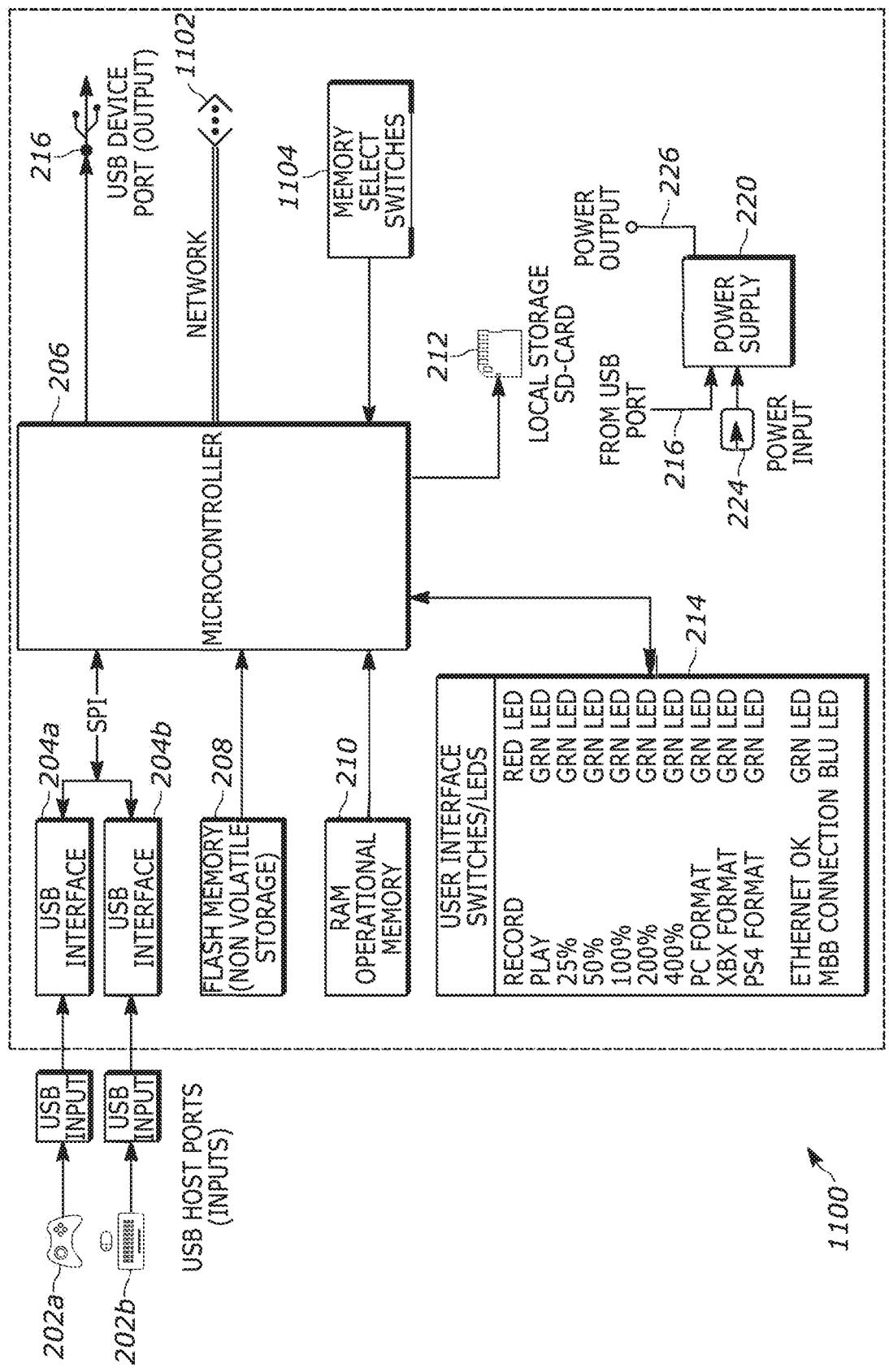
FIG. 11 is a system diagram of a control device in accordance with a second embodiment of the present disclosure.

In an embodiment, an input controller 1100 includes one or more memory select switches 1104. As shown in FIG. 11, these memory select switches 1104 may be separate from the control panel 214. The structure of the input controller 1100 may be otherwise similar to that of input controller 2200. In other embodiments, the memory select switches 1104 may be incorporated into the control panel. In the embodiment shown, each memory select switch has a corresponding "memory" LED. These memory select switches 1104 and LEDs correspond to one or more memory slots, each capable of holding a separate recording. Prior to initiating the recording mode or the playback mode, a user may select one of the memory slots to either record to or play from the selected memory slot. In an embodiment, once a user selects a memory slot by pressing a memory select switch 214, the corresponding LED illuminates. For example, when a recording is being played from the first memory slot, the LED for the first memory slot would be illuminated along with the playback LED. Similarly, when a user records to the second memory slot, the LED for the second memory slot illuminates along with the recording LED. In an embodiment, when a user selects a memory slot, the corresponding LED will blink if a recording is already present, indicating that the existing recording may be played back or recorded over. If a slot is empty (i.e., has no existing recording), the corresponding LED will not be illuminated.

In an embodiment, each memory select switch 1104 corresponds to a "recording file" configured to hold a recording. As shown in FIG. 10, at any time during use, a user may press one of the memory select switches 1104 to enter a loading state 1012 in which the corresponding recording is copied into active memory 210. Thereafter, the user may press the play button to return to the playback armed state 1008 and initiate playback of the selected recording.

In an alternative embodiment, the input controller 1100 includes a passthrough button and corresponding passthrough LED. In this embodiment, the user may press the passthrough button at any time when passthrough mode is not enabled to return to the idle state 1002 and enable passthrough mode. If passthrough mode is enabled, pressing the passthrough button disables passthrough mode, allowing the user to prevent erroneous information from being sent to the video game device 104. Whenever passthrough mode is enabled, the passthrough LED is illuminated.

In an embodiment, the input controller 1100 is adapted to use a separate network 1204 (i.e., the BB Network) that differs from that used by the gaming devices 104. As shown in FIG. 11, the input controller 1100 may be connected to the BB Network 1204 via network connection 1102.

Figure 12:
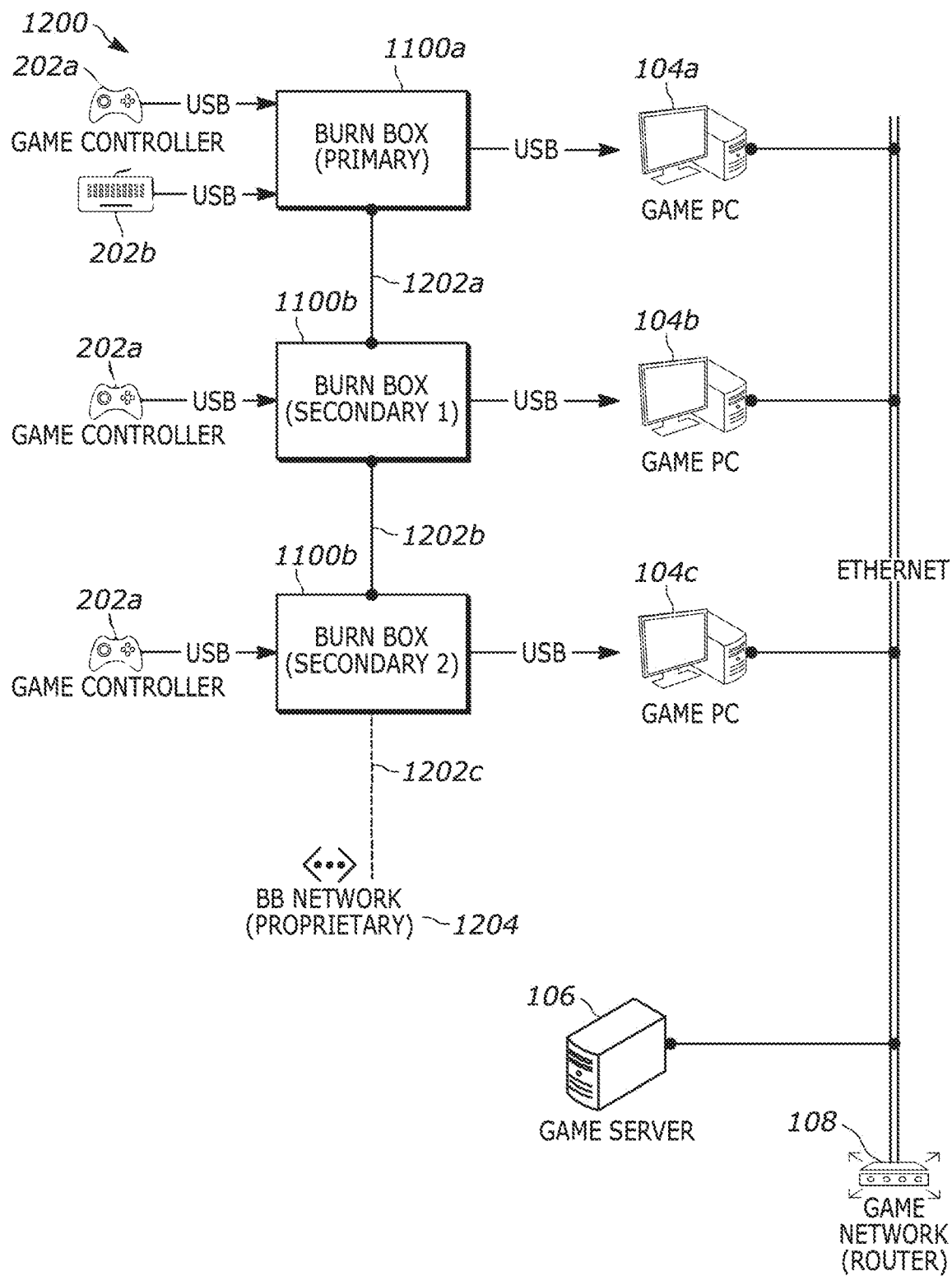
FIG. 12 is a system diagram of a system in accordance with the second embodiment of the present disclosure incorporating a plurality of the control devices of FIG. 11.

As shown in FIG. 12, in an embodiment, the primary input controller 1100a is connected to a secondary input controller 1100b, which is in turn connected to one or more additional secondary input controllers 1100b. Each input controller 1100 is configured to relay commands to other connected input controllers 1100, forming a peer-to-peer network 1204. In alternative embodiments, each input controller 202, 808 is connected to a router (not shown) which relays commands. Other network topographies are also contemplated, as will be clear to one of skill in the art. In this manner, communications sent by the input controllers 1100 are kept entirely separate from that of the gaming devices 104 which may improve network latency and ensure that commands issued between input controllers 1100 are not delayed.

It is to be understood that the preceding is merely a detailed description of some examples and embodiments of the present invention and that numerous changes to the disclosed embodiments may be made in accordance with the disclosure made herein without departing from the spirit or scope of the invention. The preceding description, therefore, is not meant to limit the scope of the invention, but to provide sufficient disclosure to allow one of ordinary skill in the art to practice the invention without undue burden.

What is claimed is:

1. An input controller for a video game system, the input controller comprising:
a microcontroller operatively coupled to a non-transitory memory;

an input interface operatively coupled to the microprocessor and configured to receive one or more input commands in an input format from an input device;

an output interface operatively coupled to the microprocessor and configured to send one or more output commands in an output format to a video game system;

wherein the input controller is communicatively coupled to a network and is configured to receive a record command via the network; and wherein the non-transitory memory comprises a plurality of computer-readable instructions that, when executed by the microprocessor, cause the input controller to perform the steps of:

waiting to receive the one or more input commands;

upon receipt of the one or more input commands, translating the one or more input commands to one or more stored commands in a stored format, wherein each of the one or more stored commands corresponds to a respective one of the one or more input commands;

if the record command has been received, saving the one or more stored commands to the non-transitory memory;

translating the one or more stored commands to the output format to produce the one or more output commands, wherein each of the one or more output commands corresponds to a respective one of the one or more input commands; and transmitting the one or more output commands to the video game system.

2. The input controller of claim 1, wherein the stored format differs from the input format and the output format.

3. The input controller of claim 1, wherein the stored format is the same as the input format.

4. The input controller of claim 1, wherein the stored format is the same as the output format.

5. The input controller of claim 1, wherein the computer-readable instructions, when executed by the microprocessor, cause the input controller to perform the further steps of:

accessing the one or more stored commands in the non-transitory memory;

translating the one or more stored commands to the output format to produce a second set of output commands, wherein each of the second set of output commands corresponds to a respective one of the one or more stored commands; and transmitting the second set of output commands to the video game system.

6. The input controller of claim 5, wherein the second set of output commands are transmitted to the video game system at a speed different than the one or more input commands were received.

7. The input controller of claim 6, wherein the second set of output commands are transmitted to the video game system at double the speed at which the one or more input commands were received.

8. The input controller of claim 6, wherein the second set of output commands are transmitted to the video game system at half the speed at which the one or more input commands were received.

9. An input controller for a video game system, the input controller comprising:

a microcontroller operatively coupled to a non-transitory memory containing one or more stored commands in a stored format;

an output interface operatively coupled to the microprocessor and configured to send one or more output commands in an output format to a video game system;

wherein the input controller is communicatively coupled to a network; and wherein the non-transitory memory further comprises a plurality of computer-readable instructions that, when executed by the microprocessor, cause the input controller to perform the steps of:

upon receipt of a playback command via the network, accessing the second set of stored commands in the non-transitory memory;

translating the second set of stored commands to the output format to produce a first set of output commands, wherein each of the first set of output commands corresponds to a respective one of the one or more stored commands; and transmitting the first set of output commands to the video game system.

10. The input controller of claim 9, wherein the playback command specifies a time at which to begin transmitting the first set of output commands to the video game system and where in the first set of output commands are not transmitted to the video game system until the time specified in the playback command.

11. The input controller of claim 9, wherein the computer-readable instructions, when executed by the microprocessor, cause the input controller to perform the further steps of:

receiving a stop command from the network and, upon receipt of the stop command, ceasing transmission of the first set of output commands to the video game system.

12. The input controller of claim 9, wherein the playback command specifies a speed at which to transmit the first set of output commands.

13. The input controller of claim 12, wherein the first set of output commands are transmitted to the video game system at double the speed at which the one or more input commands were received.

14. The input controller of claim 9, wherein the input controller is configured to receive a second set of stored commands via the network and store the second set of stored commands in the non-transitory memory and wherein the computer-readable instructions, when executed by the microprocessor, cause the input controller to perform the further steps of:

upon receipt of the second playback command via the network, accessing the second set of stored commands in the non-transitory memory;

translating the second set of stored commands to the output format to produce a second set of output commands, wherein each of the second set of output commands corresponds to a respective one of the second set of stored commands; and transmitting the second set of output commands to the video game system.

15. An input controller for a video game system, the input controller comprising:

a microcontroller operatively coupled to non-transitory memory, wherein the non-transitory memory comprises one or more stored commands in a stored format and each of the one or more stored commands has a corresponding stored timestamp;

an output interface operatively coupled to the microprocessor and configured to send one or more output commands in an output format to a video game system, wherein the stored format differs from the output format;

wherein the non-transitory memory further comprises a plurality of computer-readable instructions that, when executed by the microprocessor, cause the input controller to perform the steps of:

adjusting each of the stored timestamps by a scaling factor to produce adjusted timestamps, wherein each adjusted timestamp is associated with a respective one of the stored commands;

translating each of the one or more stored commands from the stored format to the output format to produce the one or more output commands, wherein each of the one or more output commands corresponds to a respective one of the one or more input commands and is associated with a respective one of the adjusted timestamps; and transmitting the one or more output commands to the video game system based on the adjusted timestamps.

16. The input controller of claim 15, wherein the input controller is communicatively coupled to a network and is configured to receive a playback command via the network and does not begin sending the one or more output commands to the video game system until the playback command is received.

17. The input controller of claim 16, wherein the input controller is configured to receive a stop command via the network and cease sending the one or more output commands to the video game system upon receipt of the stop command.

18. The input controller of claim 16, wherein the playback command specifies the scaling factor.

* * * * *